United States Patent
Ozcelik et al.

(10) Patent No.: US 6,449,311 B1
(45) Date of Patent: *Sep. 10, 2002

(54) METHODS AND APPARATUS FOR ERROR CONCEALMENT UTILIZING TEMPORAL DOMAIN MOTION VECTOR ESTIMATION

(75) Inventors: Taner Ozcelik, Fremont; Gong-san Yu; Shrish C. Gadre, both of San Jose, all of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/546,782

(22) Filed: Apr. 11, 2000

Related U.S. Application Data

(62) Division of application No. 08/816,867, filed on Mar. 13, 1997, now Pat. No. 6,078,616.

(51) Int. Cl.[7] .................................................. H04N 7/12
(52) U.S. Cl. .................................................. 375/240.16
(58) Field of Search ........................ 375/240.16, 240.24, 375/240.27; H04N 7/12

(56) References Cited

U.S. PATENT DOCUMENTS

| | | | |
|---|---|---|---|
| 4,814,755 A | 3/1989 | Johnson et al. | 340/709 |
| 4,868,884 A | 9/1989 | Miyazaki et al. | 382/30 |
| 5,386,234 A | 1/1995 | Veltman et al. | 348/409 |
| 5,461,420 A | 10/1995 | Yonemitsu et al. | 348/401 |
| 5,481,553 A | 1/1996 | Suzuki et al. | 371/49.1 |
| 5,515,388 A | 5/1996 | Yagasaki | 371/49.1 |
| 5,630,037 A | 5/1997 | Schindler | 395/131 |
| 5,687,251 A | 11/1997 | Erler et al. | 382/133 |
| 5,887,082 A | 3/1999 | Mitsunaga et al. | 382/199 |
| 5,892,853 A | 4/1999 | Hirani et al. | 382/280 |

FOREIGN PATENT DOCUMENTS

EP  0727910 A2  8/1996  ............ H04N/7/68

OTHER PUBLICATIONS

K. Popat et al., "Novel cluster–based probablity model for texture synthesis, classification, and compression", Massachusetts Institute of Technology, Media Laboratory, SPIE vol. 2094, pp. 756–768, Nov. 1993.
IEEE Transactions on Medical Imaging, vol. MI–1, No. 2, pp. 81–94, Oct. 1982, D.C. Youla et al, Image Restoration by the method of convex projections: Part 1–Theory.
IEEE Transactions on Medical Imaging, vol. MI–1, No. 2, pp. 95–101, Oct. 1982, M.I. Sezan et al., "Image Restoration by the method of convex projections: Part 2–Applications and Numerical Results."
Optical Society Of America, vol. 6, No. 6, pp. 844–851, Jun. 1989, H. Peng et al., "Signal Recovery with Similarity Constraints."
IEEE November 1994, p. Ferreira et al., Errorless Restoration Algorithms for band–Limited Images," pp. 157–161.
Optical Society of America, vol. 6, No. 6, pp. 844–851, Jun. 1989, H. Peng et al., "Signal Recovery with Similarity Constraints."
IEEE Nov. 1994, P. Ferreira et al., "Errorless Restoration Algorithms for Band–Limited Images," pp. 157–161.

*Primary Examiner*—Young Lee
(74) *Attorney, Agent, or Firm*—Seong-Kun Oh

(57) ABSTRACT

A method and apparatus for concealing errors during decoding of a video bit stream utilize estimates, if possible, motion vectors in the temporal domain. If estimation in the temporal domain is not possible, motion vectors are estimated in the spatial domain. A macroblock is then estimated based upon the estimated motion vector. If estimation in the spatial domain is not possible, macroblock estimation is made without the use of an estimated motion vector.

20 Claims, 10 Drawing Sheets

PREVIOUS FRAME

CURRENT FRAME

MB ESTIMATION WITH ESTIMATED MV $-MB(k,\vec{p}) = MB(k-m, \vec{p} - -MV(k,\vec{p}))$ $-MV(k,\vec{p})$    ESTIMATED MV FOR CURRENT FRAME, THE k-th FRAME, AT THE MACROBLOCK POSITIONED BY THE VECTOR, p.

m    FRAME INDEX DIFFERENCE BETWEEN CURRENT FRAME AND THE FORWARD REFERENCE FRAME.

$MB(k-m,\vec{p})$    DECODED MB ON FORWARD REFERENCE FRAME AT THE MACROBLOCK POSITIONED BY THE VECTOR, p.

METHODS AND APPARATUS FOR ERROR CONCEALMENT UTILIZING TEMPORAL DOMAIN MOTION VECTOR ESTIMATION

This is a divisional of Application Ser. No. 08/816,867, filed Mar. 13, 1997 now U.S. Pat. No. 6,078,616.

BACKGROUND OF THE INVENTION

1. Field of the Invention

The present invention relates generally to video encoding and decoding and, in particular, to methods and apparatus for error concealment in video encoding and decoding.

2. Description of the Related Art

Advances in audio and video compression and decompression techniques, together with very large scale integration technology, have enabled the creation of new capabilities and markets. These include the storage of digital audio and video in computers and on small optical discs as well as the transmission of digital audio and video signals from direct broadcast satellites.

Such advances were made possible, in part, by international standards which provide compatibility between different approaches to compression and decompression. One such standard is known as "JPEG," for Joint Photographic Expert Group. A later developed standard is known as "MPEG 1." This was the first set of standards agreed to by the Moving Pictures Expert Group. Yet another standard is known as "ITU-T H.261", which is a video compression standard particularly useful for video teleconferencing. Although each standard is designed for a specific application, all of the standards have much in common.

MPEG1 was designed for storing and distributing audio and motion video, with emphasis on video quality. Its features include random access, fast forward and reverse playback. MPEG1 serves as the basis for video compact disks and for many video games. The original channel bandwidth and image resolution for MPEG1 were established based upon the recording media then available. The goal of MPEG1 was the reproduction of recorded digital audio and video using a 12 centimeter diameter optical disc with a bit rate of 1.416 Mbps, 1.15 Mbps of which are allocated to video.

The compressed bit streams generated under the MPEG1 standard implicitly define the decompression algorithms to be used for such bit streams. The compression algorithms, however, can vary within the specifications of the MPEG 1 standard, thereby allowing the possibility of a proprietary advantage in regard to the generation of compressed bit streams.

A later developed standard known as "MPEG2" extends the basic concepts of MPEG1 to cover a wider range of applications. Although the primary application of the MPEG2 standards is the all digital transmission of broadcast-quality video at bit rates of 4 Mbps to 9 Mbps, it appears that the MPEG2 standard may also be useful for other applications, such as the storage of full length motion pictures on Digital Video Disk ("DVD") optical discs, with resolution at least as good as that presently provided by 12 inch diameter laser discs.

The MPEG2 standard relies upon three types of coded pictures. I ("intra") pictures are fields or frames coded as a stand-alone still image. Such I pictures allow random access points within a video stream. As such, I pictures should occur about two times per second. I pictures should also be used where scene cuts (such as in a motion picture) occur.

P ("predicted") pictures are fields or frames coded relative to the nearest previous I or P picture, resulting in forward prediction processing. P pictures allow more compression than I pictures through the use of motion compensation, and also serve as a reference for B pictures and future P pictures.

B ("bidirectional") pictures are fields or frames that use the most closest (with respect to display order) past and future I or P picture as a reference, resulting in bidirectional prediction. B pictures provide the most compression and increase signal to noise ratio by averaging two pictures.

Such I, P and B pictures are more thoroughly described in U.S. Pat. Nos. 5,386,234 and 5,481,553 assigned to Sony Corporation and said U.S. Patents are incorporated herein by reference.

A group of pictures ("GOP") is a series of one or more coded pictures which assist in random accessing and editing. A GOP value is configurable during the encoding process. Since the I pictures are closer together, the smaller the GOP value, the better the response to movement. The level of compression is, however, lower.

In a coded bitstream, a GOP must start with an I picture and may be followed by any number of I, P or B pictures in any order. In display order, a GOP must start with an I or B picture and end with an I or P picture. Thus, the smallest GOP size is a single I picture, with the largest size being unlimited.

In further detail, FIG. 1 illustrates a simplified block diagram of an MPEG2 encoder 100. A video stream consisting of macroblock information and motion compensation information is provided to both a discrete cosine transformer 102 and a motion vector generator 104. Each 8×8 block (of pixels or error terms) is processed by the discrete cosine transformer 102 to generate an 8×8 block of horizontal and vertical frequency coefficients. The quantizer 106 quantizes the 8×8 block of frequency-domain error coefficients, thereby limiting the number of allowed values.

Higher frequencies are usually quantized more coarsely than low frequencies, taking advantage of the human perception of quantization error. This results in many frequency-domain error coefficients being zero, especially at higher frequencies.

The output of quantizer 106 is processed by a zigzag scanner 108, which, starting with DC components, generates a linear stream of quantized frequency coefficients arranged in order of increasing frequency. This produces long runs of consecutive zero coefficients, which are sent to the variable length encoder 110.

The linear stream of quantized frequency-domain error coefficients is first run-length encoded by the variable length encoder 110. In the run-length encoding process, the linear stream of quantized frequency-domain error coefficients is converted into a series of run-amplitude (or run-level) pairs. Each pair indicates the number of zero coefficients and the amplitude of the non-zero coefficient which ends the run.

For example, assume a string of error coefficients as follows:
(1) Original error coefficients: 000060000038
Therefore, when this string of error coefficients is variable length encoded, according to the encoding rules described above, the following encoded run-level pairs are obtained:
(2) Encoded run-level pairs: (4,6) (5,3) (0,8)
Of course, as the number of zero coefficients is increased, the error coefficient data will be more effectively compressed by this variable length encoding.

After the variable length encoder 110 encodes the run-level pairs, it then Huffman encodes the run-level pairs. In the Huffman encoding, the run-level pairs are coded differently depending upon whether the run-level pair is included in a list of commonly-occurring run-level pairs. If the run-level pair being Huffman encoded is on the list of commonly-occurring pairs, then it will be encoded into a predetermined variable length code word which corresponds to the run-level pair. If, on the other hand, the run-level pair is not on the list, then the run-level pair is encoded as a predetermined symbol (such as an escape symbol) followed by a fixed length codes to avoid long code words and to reduce the cost of implementation.

The run-length encoded and Huffman encoded output of the variable length encoder 110 provides a coded video bitstream. Picture type determination circuit 112 determines whether the frame being encoded is a P picture, an I picture or a B picture. In the case of a P or I picture, picture type determination circuit 110 causes the motion vector generator 104 to generate an appropriate motion vector which is then provided to variable length encoder 110. Such motion vector is then coded and combined with the output of variable length encoder 110.

Referring now to FIGS. 2 and 3, the concept of motion compensation is explained. Motion compensation improves compression of P and B pictures by removing temporal redundancies between pictures. With MPEG 2, it operates at the macroblock level. For example, a previous frame 200 contains, among other macroblocks, a macroblock 202 consisting of 16 pixels (also referred to as "pels") by 16 lines. Motion compensation relies on the fact that, except for scene cuts, most images remain in the same location from frame to frame, whereas others move only a short distance. Thus, such motion can be described as a two-dimensional motion vector that specifies where to retrieve a macroblock from a previously decoded frame to thereby predict the pixel values of a current macroblock. Thus, a macroblock 300 of a current frame 302 can be represented by the macroblock 202 (of FIG. 2) as modified by a two dimensional motion vector 304. It is to be understood that the macroblock 300 may or may not be within the same boundaries surrounding macroblock 202 in the previous frame 200.

After a macroblock has been compressed using motion compensation, it contains both the prediction (commonly referred to as "motion vectors") and temporal difference (commonly referred to as "error terms") between the reference macroblock and the macroblock being coded.

Returning to FIG. 1, when the coded video bitstream output from variable length encoder 110 is recorded onto a recording medium such as an optical disk, and such recorded information is reproduced for local use, although not completely error free, the decoded (coded) video bit stream is, generally, sufficiently error free so as to not require additional techniques to compensate for errors in the decoded video bit stream. Such a coded video bit stream is typically referred to as a "program stream." When the coded video bitstream output from variable length encoder 110 is transported by, for example, satellite or cable transmission systems, either directly from variable length encoder 110 or from a recording medium onto which the coded video bitstream has been recorded, the probability of errors in the decoded video bitstream increases. Such a coded bitstream is typically referred to as a "transport stream."

Since traditional error detection and correction systems, such as interleaving, require a significant amount of overhead as well as a significant amount of data processing when decoding coded video bitstream signals, current video decoding systems rely upon error concealment as opposed to error correction. In contrast to error correction, which attempts to reconstruct lost or corrupt data, error concealment aims to generate data which can be substituted for the lost or corrupt data, where any discrepancies in image created by the generated data (generally at the macroblock level) are not likely to be perceived by a viewer of a video image which relies upon such error concealment.

Accordingly, it would be desirable to provide-a method and apparatus for concealing errors where the visual effect perceived by a viewer is negligible, and where the method and apparatus adapt to the different types of available information as may be available to provide such concealment.

SUMMARY OF THE INVENTION

It is an object of the invention to provide a method and apparatus for concealing errors during decoding of compressed video signals.

It is a further object of the invention to provide a method and apparatus for detecting errors which do not produce illegal syntax.

It is a feature of the invention to utilize a temporal prediction of a motion vector to generate a macroblock which will effectively conceal an error in a data stream.

It is a further feature of the invention to compare DC coefficients of a current macroblock to a predicted coefficient to determine whether an error which does not produce illegal syntax has occurred.

It is an advantage of the invention to improve the quality of concealment of an error in a data stream.

It is a further advantage of the invention to improve the quality of detection of an error in a data stream.

According to one aspect of the invention, an apparatus for concealing errors includes a detector for detecting the presence of an error in data representing the current macroblock, a system for estimating the at least one motion vector based upon a difference between a forward reference frame at the current macroblock and a decoded motion vector for the forward reference frame at the current macroblock, and a system for estimating the current macroblock based upon the estimated at least one motion vector. According to another aspect of the invention, a method for concealing errors includes the steps of detecting the presence of an error in data representing the current macroblock, estimating the at least one motion vector based upon a difference between a forward reference frame at the current macroblock and a decoded motion vector for the forward reference frame at the current macroblock, and estimating the current macroblock based upon the estimated at least one motion vector.

These and other objects, features and advantages will become apparent when considered with reference to the following description and the accompanying drawings.

DETAILED DESCRIPTION OF THE PREFERRED EMBODIMENTS

Figure 1:
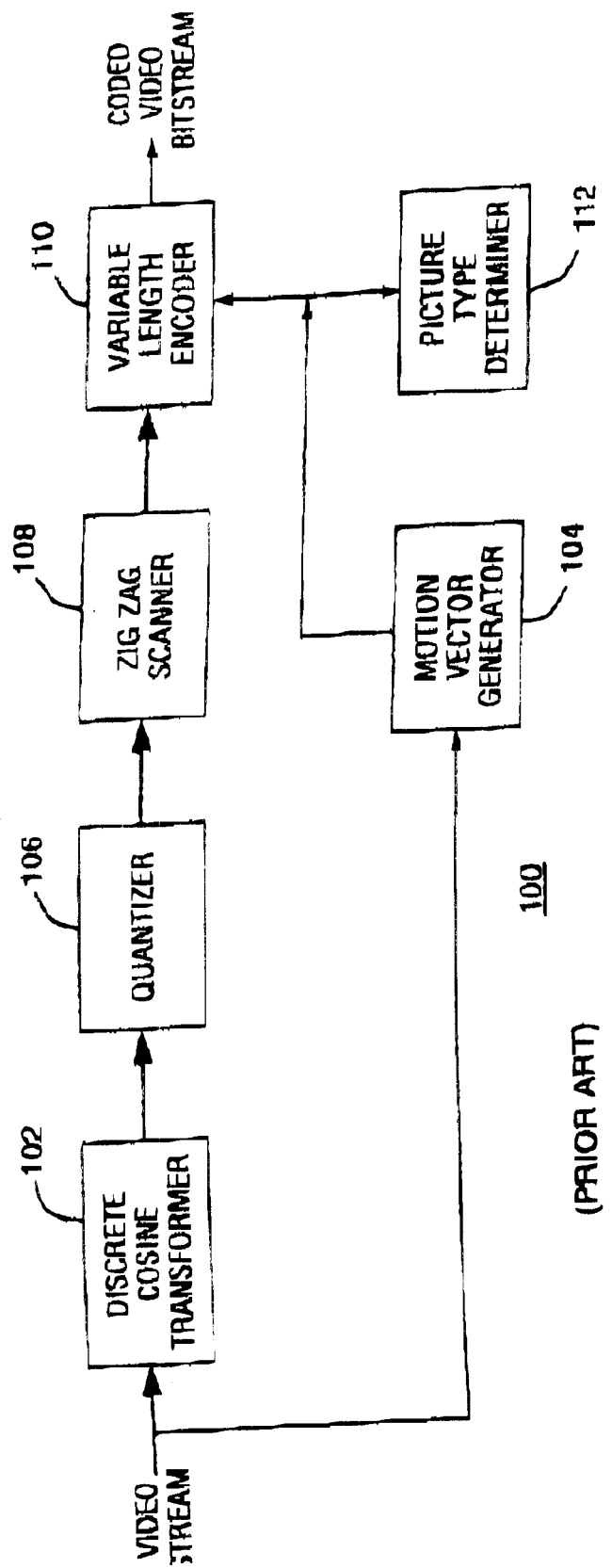
FIG. 1 is a simplified block diagram of a MPEG 2 video encoder.
Figure 2:
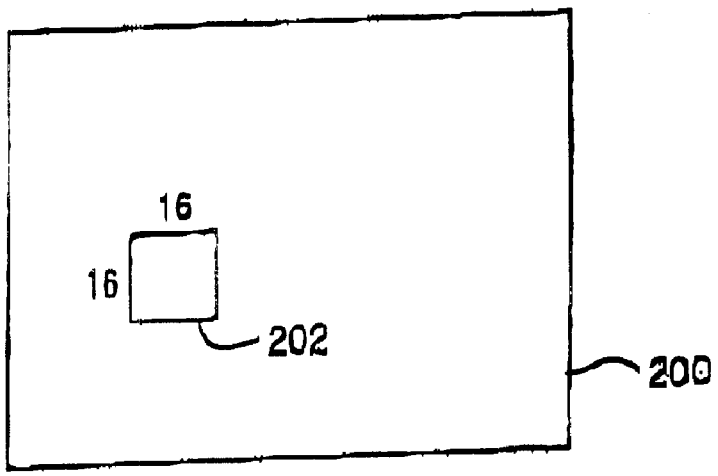
FIG. 2 is an illustration of a macroblock within a previous frame.
Figure 3:
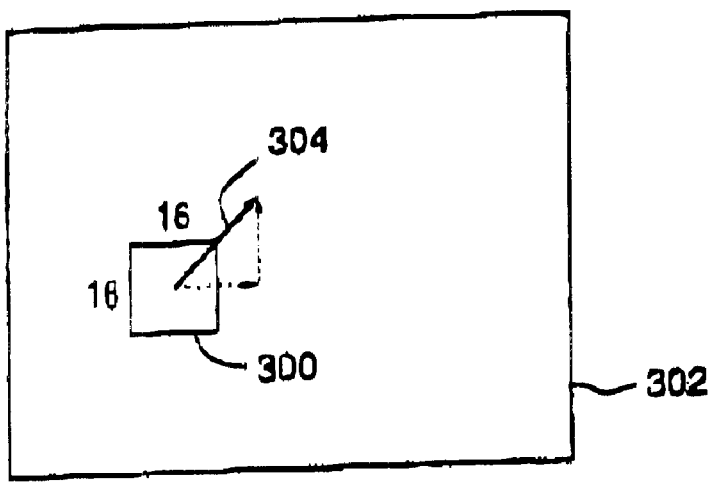
FIG. 3 is an illustration of a macroblock within a current frame.
Figure 4:
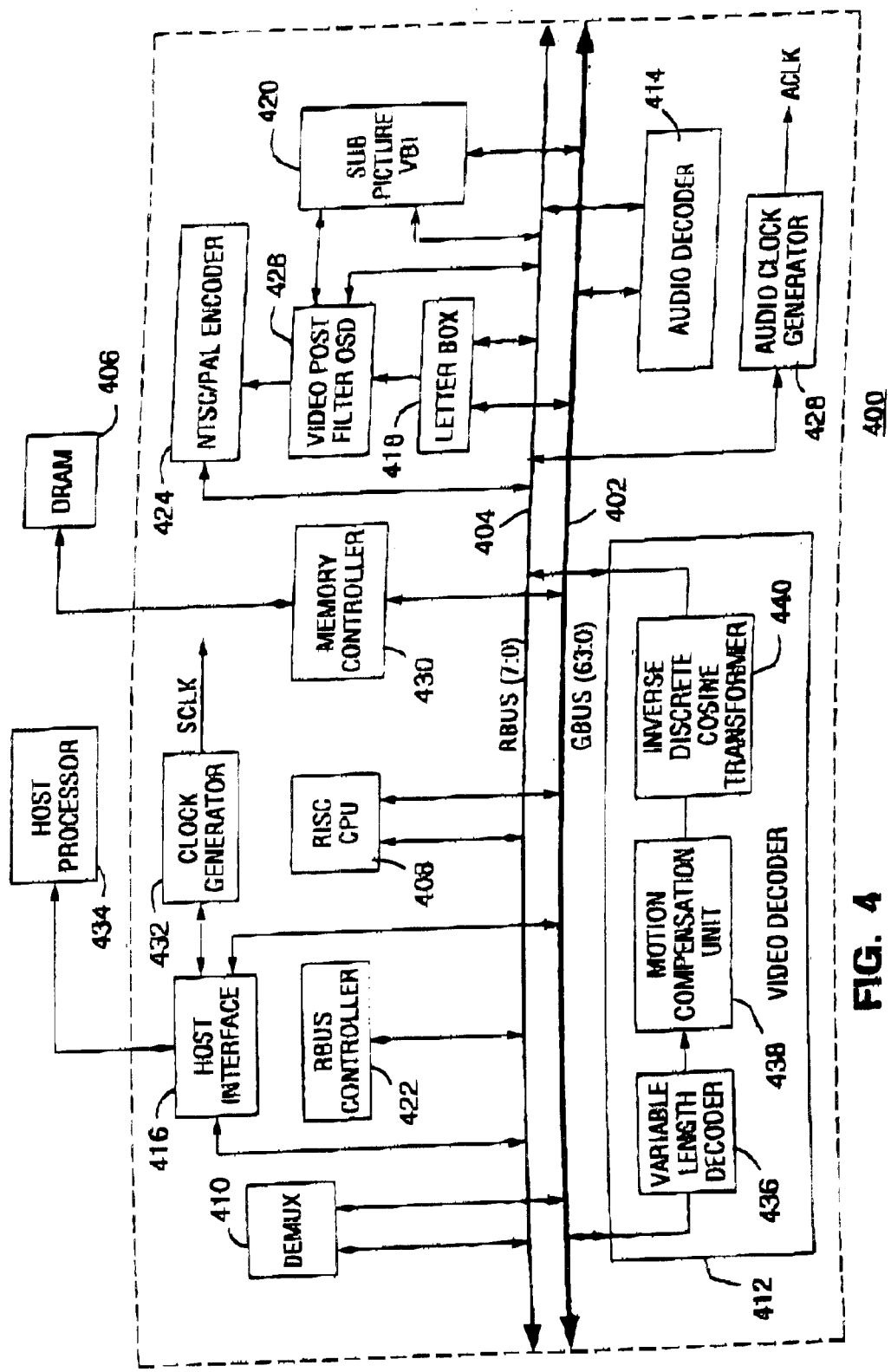
FIG. 4 is simplified block diagram of a MPEG 2 video decoder of the present invention.

Referring now to FIG. 4, a block diagram of an MPEG 2 decoder 400 is shown. Decoder 400 utilizes two internal busses, a GBUS 402 and an RBUS 404. In the preferred embodiment of the invention, GBUS 402 is a 64 bit bus which is utilized for data transfer between DRAM 406 and specific blocks of decoder 400 which are described below. In the preferred embodiment of the invention, DRAM 406 is a static dynamic random access memory, although other types of memories may be utilized. RBUS 404 is an 8 bit but used primarily for control of specific blocks through reduced instruction set computing ("RISC") CPU 408. RISC CPU 408, which is coupled to both GBUS 402 and RBUS 404, operates to control the functionality of specific blocks, as more particularly described below, as well as performing a portion of video bitstream decoding.

Decoder 400 includes a demultiplexer 410 which is coupled to both GBUS 402 and RBUS 404. Similarly, a video decoder 412, an audio decoder 414, a host interface 416, a letter box unit 418, and a sub picture/vertical blanking interval decoder 420 are each coupled to both GBUS 402 and RBUS 404. An RBUS controller 422, an NTSC/PAL encoder 424, a video post filter/on screen display system 426 and an audio clock generator 428 are each coupled to RBUS 404. Audio clock generator 428 outputs a clock signal ACLK. A memory controller 430 is coupled to GBUS 402.

A clock generator 432, which provides a clock signal SCLK, is coupled to host interface 416. An output of letter box unit 418 is provided to video post filter on screen display system 426. Sub picture/vertical blanking interval decoder 420 is coupled to video post filter on screen display system 426, which system provides its output to NTSC/PAL encoder 424. Sub picture/vertical blanking interval decoder 420 is coupled to video post filter on screen display system 426. A host processor 434 interfaces with host interface 416.

In the preferred embodiment of the invention, when utilized for DVD applications, sub picture/vertical blanking interval decoder 420 and letter box unit 418 are hardwired units. Letter box unit 418 performs a 4-tap vertical filtering and sub-sampling of a video bit stream provided through GBUS 402 and operates to control the video post filter/on screen display system 426. Sub picture/vertical blanking interval decoder 420 operates to decode sub picture ("SP") and vertical blanking interval ("VBI") information in the video bit stream. Typically, a sub picture bitstream consists of subtitles or menu items. For example, this would include karaoke and menu highlighting. Since the VBI bitstream and the SP bitstream are very similar in syntax and functionality (under MPEG 2 specifications), the functionality for decoding both types of bitstreams is incorporated into a single sub picture/vertical blanking interval decoder 420. Thus, in the preferred embodiment of the invention, decoding of the VBI bit stream occurs during the vertical blanking period, while SP bitstream decoding occurs during active display periods.

In the preferred embodiment of the invention, in non-DVD operation, the sub picture/vertical blanking interval decoder 420 decodes and displays on screen display ("OSD") bitstreams. In DVD operation, however, OSD bitstreams are instead decoded by video post filter on screen display system 426.

RISC CPU 408 operates to parse the video bitstream in order to control the decoder 400. RISC CPU 408 also partially decodes the video bitstream (for example, decoding of top-level data such as headers) and also controls various of the other units within decoder 400 through RBUS 404. A portion of the parsing is also performed by sub picture/video blanking interval decoder 420. In further detail, RISC CPU 408 can be utilized to change the position of an SP window through RBUS 404. Thus, a user can move the SP window up or down through a command to CPU 404 with a Y coordinate as a parameter.

Letter box unit 418 is essentially a vertical decimation filter with downloadable coefficients. Letter box unit 418 operates to decimate an active area of a frame which has a ratio of 4:3. Therefore, for PAL sequences, letter box unit 418 converts a 720×576 frame to a 720×432 frame. For NTSC sequences, letter box unit 418 converts a 720×480 frame to a 720×360 frame. However, in both cases, the active picture area is centered with respect to a display area.

Host processor 434 and RISC CPU 408 utilize DRAM 406 to exchange messages, commands and status information. In the preferred embodiment of the invention, processor 434 and CPU 408 have the capability to interrupt each other. In operation, CPU 408 provides a host command parser to execute such commands from host processor 434. A typical sequence of events during execution of a command by host processor 434 is:

1. Host processor 434 writes a command to DRAM 406 and interrupts CPU 408.
2. CPU 408 reads the command and parameters from DRAM 406.
3. CPU 408 acknowledges the command by writing a status variable to DRAM 406.
4. Command parser of CPU 408 parses the command and executes it.
5. Optionally, CPU 408 interrupts host processor 434 upon completion of the command to report status.

Alternatively, CPU 408 polls a DRAM command buffer (not shown) for every field sync. This buffer is a ring buffer where a write pointer is maintained by host processor 434 while a read pointer is maintained by CPU 408.

Video decoder 412 contains an inverse cosine discrete transformer, a variable length decoder 436, a motion compensation unit 438 and an inverse discrete cosine transformer 440. Video decoder 412 decodes a coded video data stream received through GBUS 402 and provides a decoded stream to NTSC/PAL encoder 424 through RBUS 404. NTSC/PAL encoder converts the decoded stream into an analog signal suitable for display on a television monitor having NTSC and/or PAL signal inputs.

Demultiplexer 410 operates on data entering decoder 400. In particular, such data is in the form of packets, and includes audio, video and other streams of multiplexed packets. Demultiplexer 410 selects desired audio packets, video packets and other desired information packets, but rejects the other packets within the video bitstream. For example, audio packets representing audio in several different languages may be present in the video bitstream. Based upon commands from host processor 434, demultiplexer 410 selects only those audio packets corresponding to that language which is selected for presentation with the corresponding video packets.

Host interface 416 provides a glueless interface for host processor 434. RBUS controller 422 sends out messages on RBUS 404 and acts as an arbitrator for RBUS 404. Clock generator 432 provides a clock signal SCLK to the various units within decoder 400, while audio clock generator 428 provides a clock signal ACLK to a digital-to-analog convertor (not shown) which through GBUS 402 receives digital audio signals from audio decoder 414. These digital audio signals are converted to analog signals which can be perceived by humans.

Figure 5:
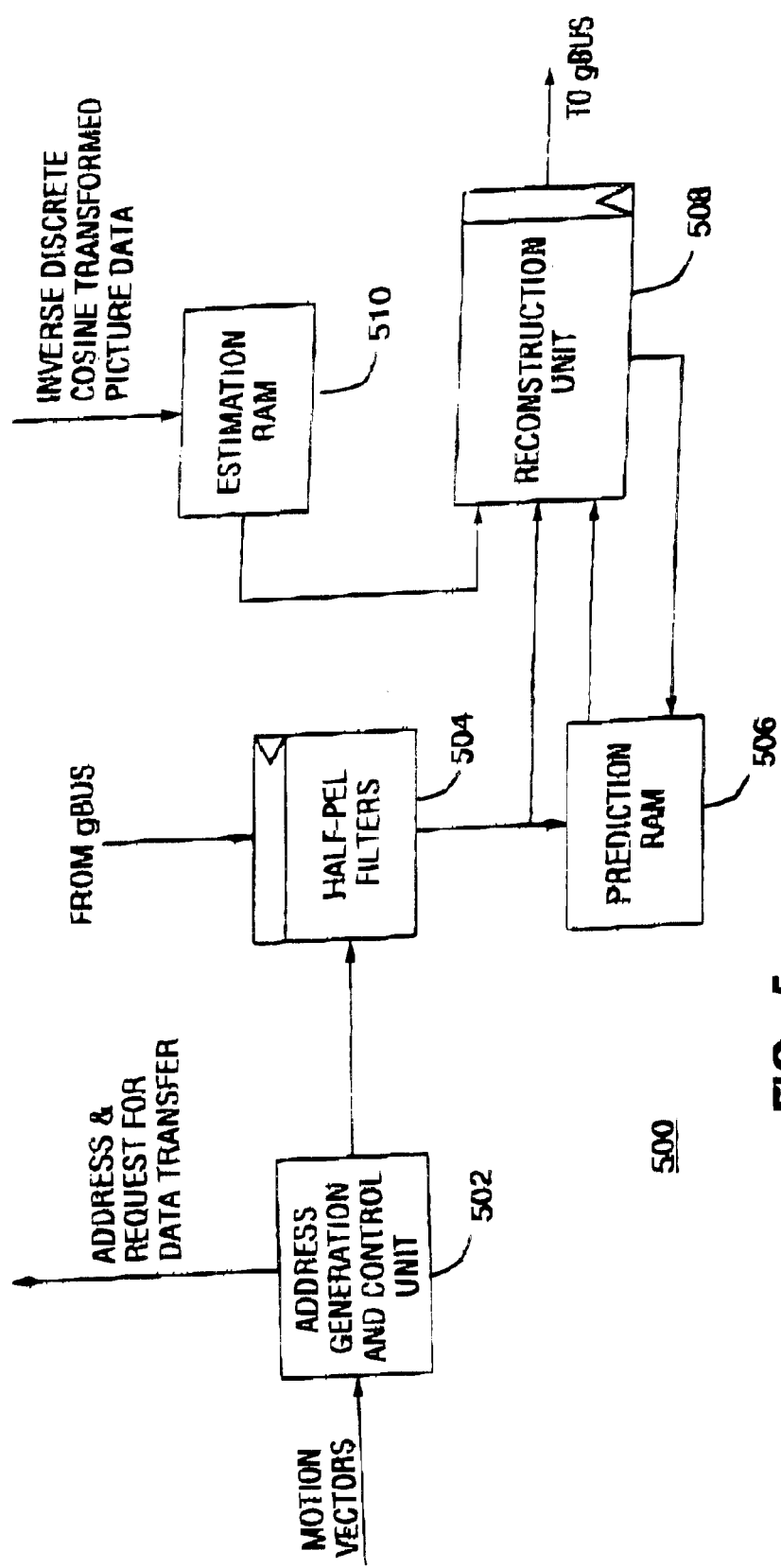
FIG. 5 is a block diagram of a motion compensation system of the present invention.

With reference now to FIG. 5, the motion compensation system of the video decoder 412 of FIG. 4 is now explained. The motion compensation unit 500 includes an address generation and control unit 502. The address generation and control unit 502 corresponds to the memory controller 430 of FIG. 4. The address generation and control unit 502 accepts motion vectors from variable length decoder 436 and calculates a starting address of a reference macroblock. Based upon such calculation, the address generation and control unit 502 issues a data transfer request to the memory controller unit 430. In the preferred embodiment of the invention, data transfer occurs in 64 bit (8 byte) segments at addresses aligned at 8-byte boundaries. When this data returns from the DRAM 406, the data are latched within the motion compensation unit 500. Each 8 bit element of these latched data is then run through horizontal and vertical half-pel filters 504, and the resulting data is stored in the prediction RAM (random access memory) 506.

Since the starting address of the reference block may not be aligned at the 8-byte aligned address, multiplexing is required at the input of the prediction RAM 506. For I-pictures, prediction is not required and, therefore, the motion compensation unit sits idle. For both P and B-pictures, however, prediction data is required for reconstruction by the reconstruction unit 508 of decoded picture data. In the case of B-pictures, the predicted data is obtained by averaging two such predictions, that is, the output of the half-pel filters at the time and a value from a prediction RAM 506 that was stored after a forward prediction. The reconstruction unit 508 supports this averaging of the half-pel filters 504.

An estimation RAM 510 holds coefficient data transformed in the inverse discrete cosine transformer 440. Reconstruction of each picture starts once the estimation RAM 510 is full. The motion compensation unit 500, at such a time, issues a data transfer request and begins reconstruction. The reconstruction basically consists of adding signed numbers from the output of the inverse discrete cosine transformer stored in the estimation RAM 510 to the outputs (stored in the prediction RAM 506) of the half-pel filters 504 for non-intra blocks. For intra-blocks however, the addition is not required. In such a case, the adder output is clipped before it is latched at the output of the reconstruction unit 508 when reconstruction of the picture occurs.

Figure 6:
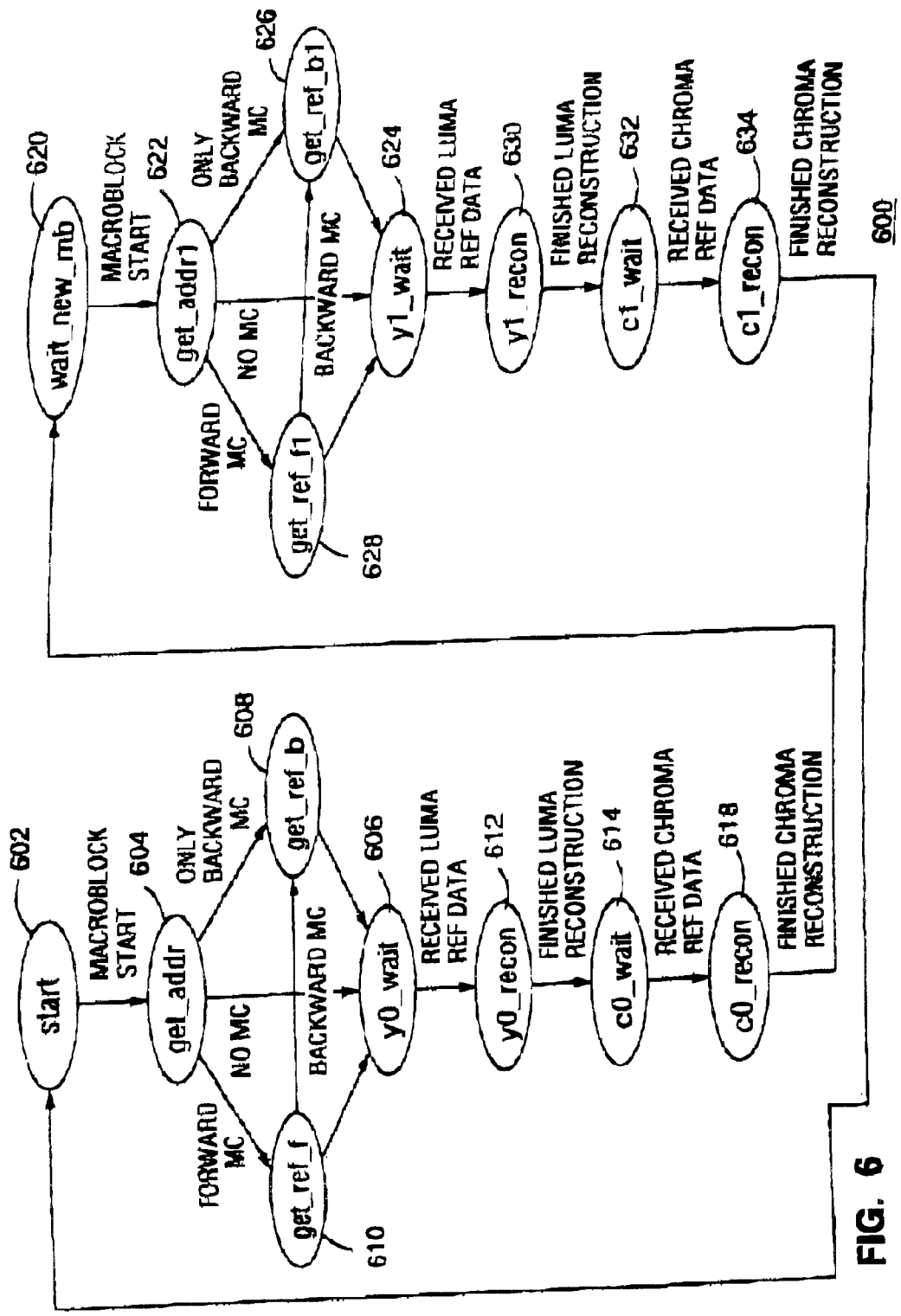
FIG. 6 is a state diagram which illustrates reference block fetch control of the address generation and control unit of FIG. 5.

Referring now to the state diagram of FIG. 6, a state machine 600 which represents the functionality of the address generation and control unit 502 in regard to the transfer of reference picture data from DRAM 406 and the construction of a macroblock is now explained. From a start state 602, a state machine 600 proceeds to a get address state 604. If no motion compensation is to be used to construct the macroblock, state machine 600 proceeds to a y0_wait state 606. If only backward motion compensation is to be utilized, then state machine 600 proceeds to state 608 to get or fetch a previous macroblock b which will serve as a reference macroblock. If however forward motion compensation is to be utilized, then state machine 600 proceeds to state 610 to get or fetch a forward macroblock f which will serve as a reference macroblock. State machine 600 then proceeds to the y0_wait state 606. If the macroblock to be constructed is to be based upon both the forward macroblock f and the previous macroblock b, then state machine 600 proceeds from state 610 to state 608 to also get or fetch a previous macroblock. In such an instance, both the forward and the previous macroblock will serve as reference macroblocks.

At state 606, state machine 600 waits for luminance data to be received in regard to the reference macroblock or macroblocks. At state 612 the luminance portion of the macroblock to be constructed is reconstructed. At state 614 state machine waits for chrominance data to be received in regard to the reference macroblock or macroblocks. At state 618 reconstruction of the chrominance portion of the macroblock to be constructed occurs. Upon completion of chrominance data reconstruction, state machine 600 proceeds to state 620 to await an instruction to construct a new macroblock.

Similar to the case of the previously constructed macroblock, state machine 600 then proceeds to a get address 1 state 622. if no motion compensation is to be used to construct the macroblock, state machine 600 proceeds to a y1_wait state 624. If only backward motion compensation is to be utilized, then state machine 600 proceeds to state 626 to get or fetch a previous macroblock b1 which will serve as a reference macroblock. If, however, forward motion compensation is to be utilized, then state machine 600 proceeds to state 628 to get or fetch a forward macroblock f1 which will serve as a reference macroblock. State machine 600 then proceeds to the y1_wait state 624. If the new macroblock to be constructed is to be based upon both the forward macroblock f1 and the previous macroblock b1, state machine 600 proceeds from state 628 to state 626 to also get or fetch the previous macroblock b1. In such an instance both the forward macroblock f1 and the previous macroblock b1 will serve as reference macroblocks.

At state 624, state machine 600 waits for luminance data to be received in regard to the reference macroblock or macroblocks. At state 630 the luminance portion of the macroblock to be constructed is reconstructed. At state 632 state machine waits for chrominance data to be received in regard to the reference macroblock or macroblocks. At state 634 reconstruction of the chrominance portion of the macroblock to be constructed occurs. Upon completion of such chrominance data reconstruction, state machine 600 proceeds to back to start state 602.

As the state transitions of FIG. 6 depict, once an address is obtained as in state 604 or 622, sampling occurs to determine whether or not motion compensation is required for a macroblock. For coded pictures that require motion compensated reference calculations, state machine 600 waits until the motion vector FIFO memory of the variable length decoder 436 is not empty. The address generation and control unit 502 then generates a request for a motion vector. Two consecutive requests, one for X (horizontal) and one for Y (vertical) components of the motion vectors are made. Once the address generation and control unit 502 obtains both components of the motion vector, the address of the reference block is calculated. The address generation and control unit 502 then sends a request for data transfer to the memory controller unit.

As mentioned above, when a motion vector points to a sub-pixel location instead of to an exact pixel location, in order to more accurately represent a P or B picture, it is necessary to generate half-pixel (half-pel) data.

In the event that during transport (or even during local reproduction) of a recorded coded video bit stream, errors are detected in the video bit stream in regard to a particular macroblock. In the preferred embodiment of the invention, the smallest unit of concealment is a slice. A slice consists of a series of sequential macroblocks. In order to provide such concealment, motion vectors are estimated using either temporal prediction or spatial prediction. In the case of spatial prediction, pixels from a successfully decoded macroblock are copied for use in decoding the macroblock having a data error. In the case of temporal prediction, motion vectors from a successfully decoded macroblock are utilized to predict a new motion vector field in order to decode the macroblock having a data error.

In further detail, if in decoding a coded video bitstream, a frame K is missing a macroblock or a portion of a macroblock (as could result from a data error), the basic concept is that if there is a motion of an object from a frame K−2 (that is, two frames prior to frame K), one can assume that this motion will most likely continue from frame K−2 up through frame K. Therefore, the assumption is that the motion will be basically linear. Based upon that assumption, the present invention estimates pixels and motion vectors, the estimation method depending upon the data available for such estimation.

In utilizing the estimated pixels and/or motion vectors, actual concealment is delayed until the occurrence of a later slice. When an error is detected, such error is recorded together with its location. In particular, data regarding the error and its location is written into a register and, after a second or third subsequent slice, an interrupt command is issued to allow processing of the macroblock utilizing estimated pixels and/or motion vectors. In the preferred embodiment of the invention, when applied to interlaced video, although four motion vectors per macroblock are available for use, only two motion vectors are utilized, as will be detailed below.

Figure 7:
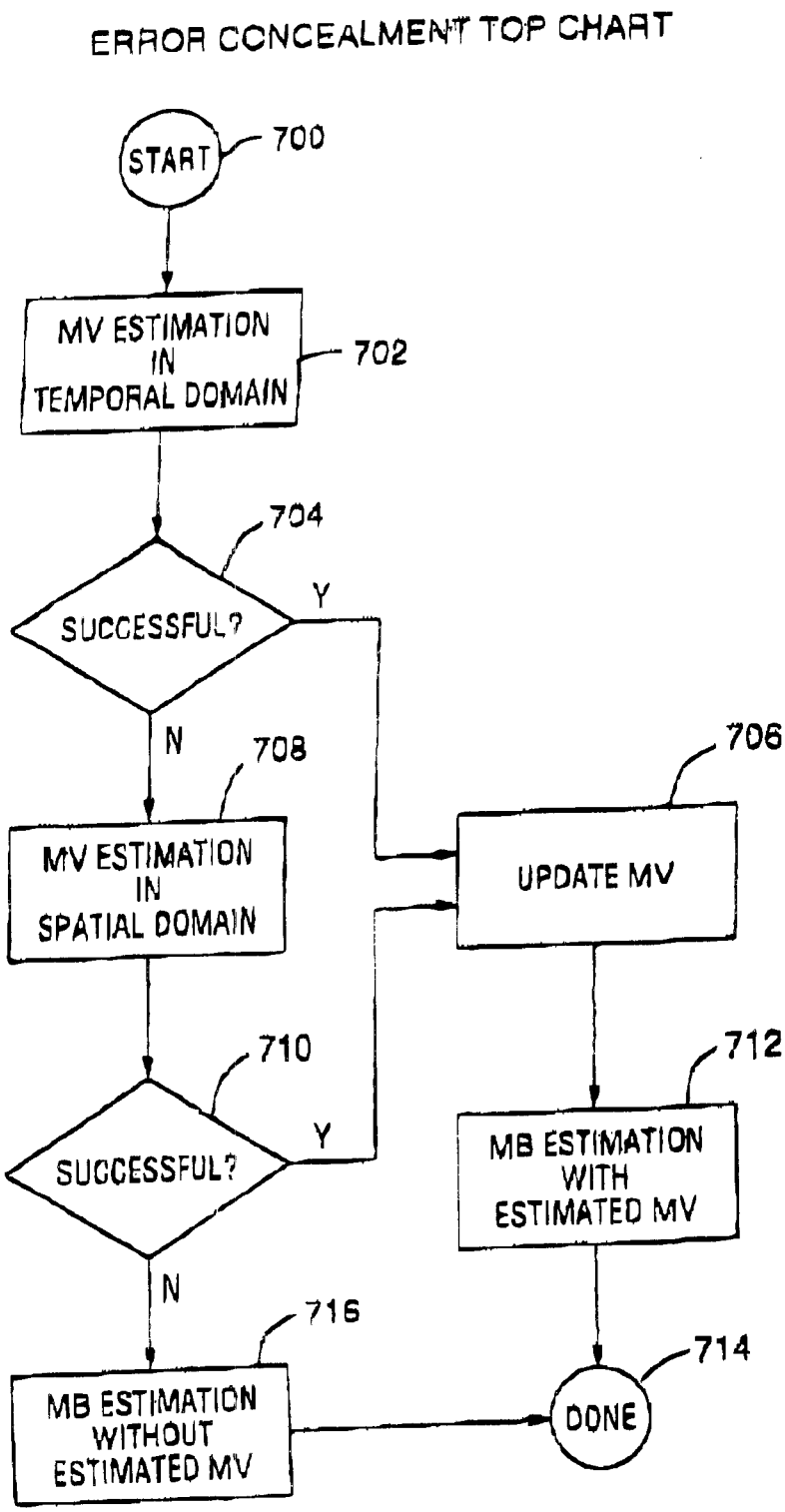
FIG. 7 is a flow chart of a method for estimating macroblocks in accordance with the present invention.
Figure 8:
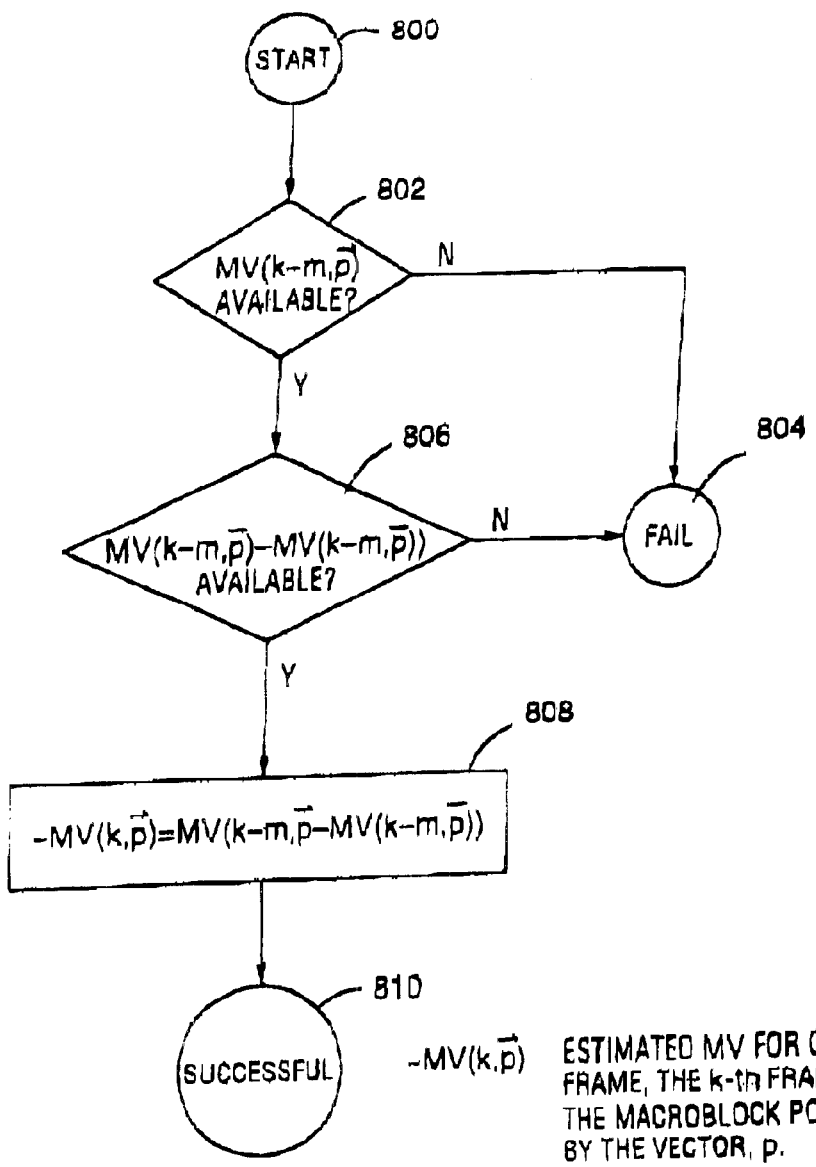
FIG. 8 is a flow chart of a method for estimating motion vectors in the temporal domain in accordance with the present invention.

Referring now to FIG. 7, the error concealment of the present invention is explained in further detail. Once an error has been detected and an interrupt command has been issued, the error concealment algorithm starts at step 700. The motion compensation unit 438 first attempts to estimate motion vectors in the temporal domain at step 702. FIG. 8 illustrates such a method. The algorithm starts at step 800. At step 802, the motion compensation unit 438 determines whether a decoded motion vector for a forward reference frame at the macroblock positioned by a vector p is available. This motion vector is designated as $MV(k-m, \vec{p})$, where k is the current frame, and m is the frame index difference between the current frame and a forward reference frame. If not, motion vector estimation in the temporal domain is not performed and the algorithm proceeds to step 804, which indicates a failed attempt. If a decoded motion vector for a forward reference frame at the macroblock positioned by the vector p is available, the algorithm proceeds to step 806, which determines whether a decoded motion vector is available for the difference between (1) a forward reference frame at the macroblock positioned by the vector p; and (2) a decoded motion vector for a forward reference frame at the macroblock positioned by the vector p, where such decoded motion vector is designated by $MV(k-m, \vec{p})$. If not available, the algorithm proceeds to step 804 to indicate a failed attempt. If available, the algorithm proceeds to step 808 at which an estimated motion vector for a current frame, the k-th frame, at the macroblock positioned by the vector p is determined. Such estimated motion vector is taken to be equal to the difference between (1) a forward reference frame at the macroblock positioned by the vector p; and (2) a decoded motion vector for a forward reference frame at the macroblock positioned by the vector p. The algorithm then proceeds to step 810 which indicates a successful motion vector estimation in the temporal domain.

Figure 9:
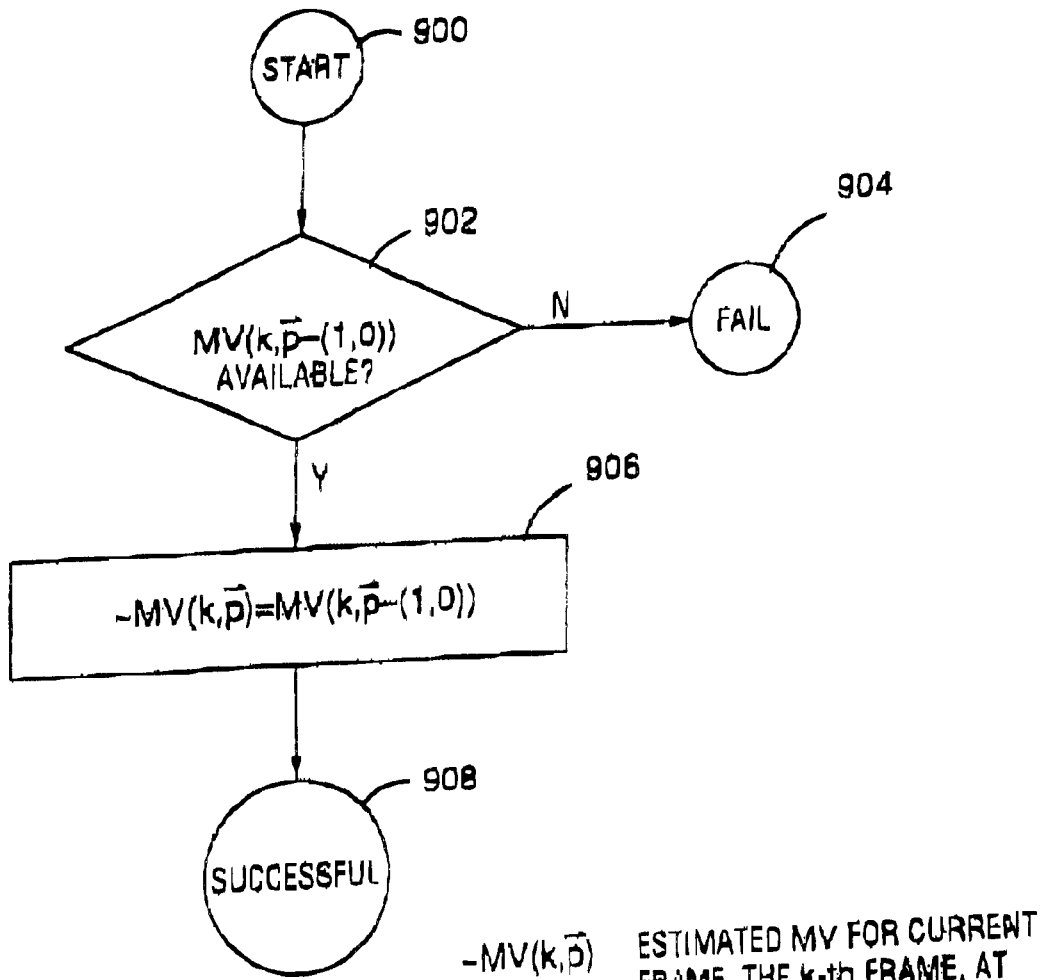
FIG. 9 is a flow chart of a method for estimating motion vectors in the spatial domain in accordance with the present invention.

Returning to FIG. 7, at step 704, it is determined whether motion vector estimation in the temporal domain was successful. If so, the algorithm proceeds to step 706, where based upon the estimated motion vector, the motion vector to be used for estimating the subject macroblock is updated. If the motion vector estimation in the temporal domain was not successful, the algorithm proceeds to step 708, where motion vector estimation is performed in the spatial domain. The algorithm for such estimation is shown in FIG. 9. The algorithm starts at step 900 of FIG. 9 and proceeds to step 902, where it is determined whether a decoded motion vector for the macroblock located immediately above the estimating macroblock is available. Such a motion vector is designated by $MV(k, \vec{p} - (1,0))$. If not, a failure is indicated at step 904. If a decoded motion vector for the macroblock located immediately above the estimating macroblock is available, then, at step 906, the motion vector for the current frame, the k-th frame at the macroblock positioned by the vector p, $\sim MV(k, \vec{p})$, is estimated to be equal to the decoded motion vector, the macroblock located immediately above the estimating macroblock, $MV(k, \vec{p} - (1,0))$, where (1,0) is a vector indicating a row index as 1 and a column index as 0. The algorithm then proceeds to step 908 which indicates a successive motion vector estimation in the spatial domain.

Returning again to FIG. 7, at step 710, a determination is made whether or not a motion vector estimation has been successfully made in the spatial domain. If such a determination has been made (step 908), then the motion vector for the current macroblock is updated at step 706. Then, at step 712, the current macroblock is estimated using the just estimated motion vector, whether that motion vector is estimated in the temporal domain at step 702 or, in the spatial domain, at step 708.

Figure 10:
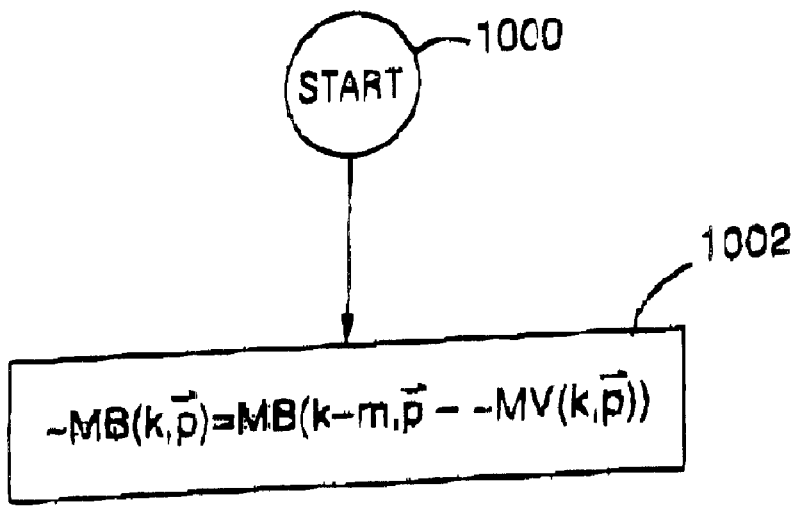
FIG. 10 is a flow chart of a method for macroblock estimation utilizing estimated motion vectors.

As shown in FIG. 10, at step 1000, macroblock estimation with the estimated motion vector is started. At step 1002, the estimated macroblock for the current frame, the k-th frame, at the macroblock positioned by the estimated motion vector p, $\sim MB(k, \vec{p})$, is estimated to be equal to the decoded macroblock of the difference of (1) the forward reference frame at the macroblock positioned by the vector p; and (2) the estimated motion vector for the current frame, the k-th frame, at the macroblock positioned by the vector p. This decoded macroblock is designated as $MB(k-m, \vec{p} \sim MV(k, \vec{p}))$, where m is the frame index difference between the current frame and a forward reference frame. Upon completion of estimation of the current macroblock at step 712, the algorithm is completed at step 714.

Figure 11:
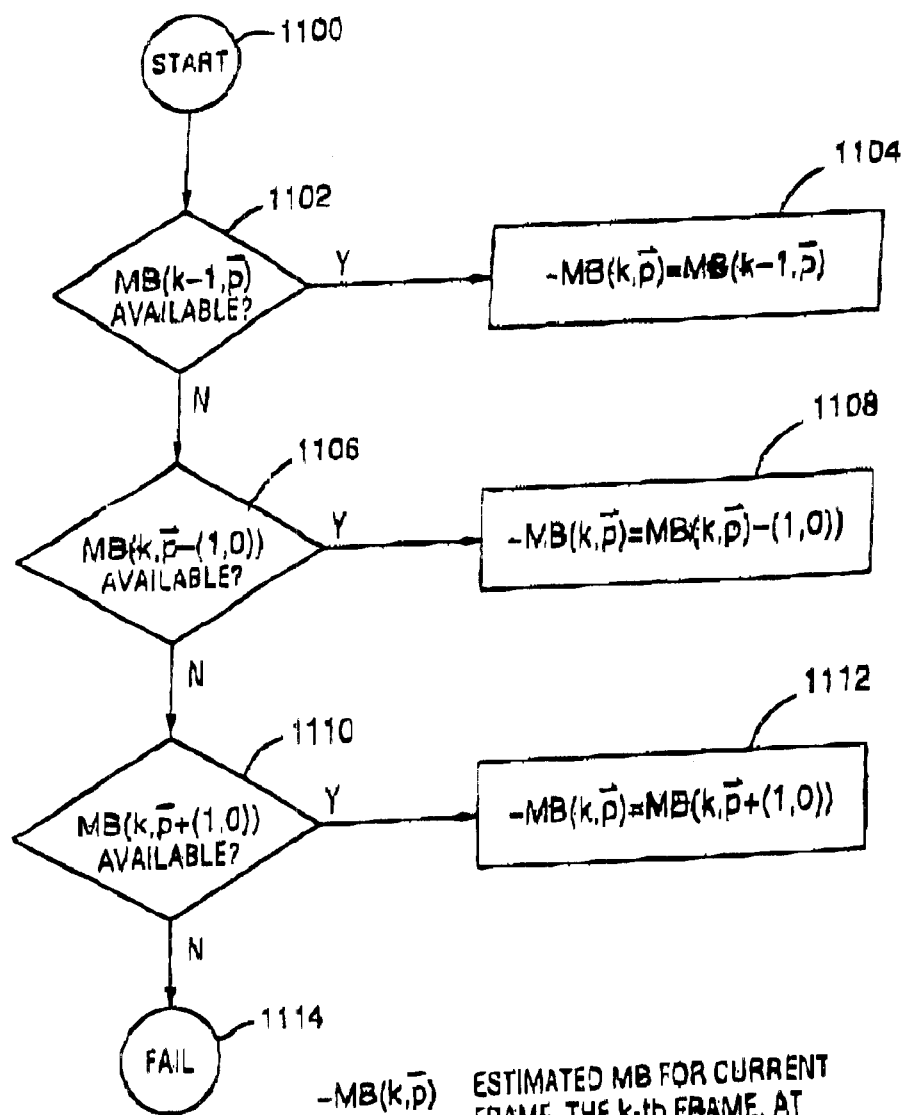
FIG. 11 is a flow chart of a method for macroblock estimation without the use of estimated motion vectors.

Returning to step 710 of FIG. 7, if motion vector estimation in the spatial domain is not successful, then, at step 716, the current macroblock is estimated without the use of an estimated motion vector. Step 716 is detailed in FIG. 11. In FIG. 11, macroblock estimation without use of an estimated motion vector starts at step 1100. At step 1102, it is determined whether the macroblock for the frame preceding the current frame (the k-th frame being the current frame) positioned by the vector p, $MB(k-1, \vec{p})$ is available. If such macroblock is available, then, at step 1104, the current macroblock positioned by the vector p is estimated to be equal to the macroblock for the frame preceding the current frame positioned by the vector p. The algorithm is then completed as indicated at step 714.

If the macroblock for the frame preceding the current frame (the k-th frame being the current frame) positioned by the vector p is not available, then, at step 1106, it is determined whether the macroblock for the current frame positioned by the vector p but indexed by minus 1 row and in the same column, MB(k, $\vec{p}$ (1,0) is available, where (1,0) is a vector indicating a row index as 1 and a column index as 0. If such a macroblock is available, then, at step 1108, the current macroblock (for the current frame, the k-th frame, positioned by the vector p) is estimated to be equal to the macroblock for the current frame positioned by the vector p but indexed by minus 1 row and in the same column, MP(k, $\vec{p}$ −(1,0)). The algorithm is then completed as indicated at step 714.

If it is determined that the macroblock for the current frame positioned by the vector p but indexed by minus 1 row and in the same column, is not available, then, at step 1110, it is then determined whether the decoded macroblock for the macroblock located immediately above the macroblock to be estimated, MB(k,p+(1,0)), is available, where (1,0) is a vector indicating a row index as 1 and a column index as 0. If the decoded macroblock for the macroblock located immediately above the macroblock to be estimated is available, then, at step 1112, the estimated macroblock for the current frame, the k-th frame, at the macroblock positioned by the vector p is estimated to be equal to such decoded macroblock for the macroblock located immediately above the macroblock to be estimated, MB(k, $\vec{p}$ +(1,0)). The algorithm is then completed as indicated at step 714. In the event that the decoded macroblock for the macroblock located immediately above the macroblock to be estimated is not available, then the macroblock estimation without an estimated motion vector fails, as indicated at step 1114. In this case, the macroblock can be left blank.

It is to be understood that, although the present invention has been described in relation to decoding of a coded video bit stream, the present invention is also applicable to the coding of a video bit stream, where an error is detected during or after coding and the error is concealed prior to recording or transport.

Although only certain embodiments have been described in detail, those having ordinary skill in the art will certainly understand that many modifications are possible without departing from the teachings hereof. All such modifications are intended to be encompassed within the following claims.

We claim:

1. A method of concealing errors while decoding a coded video bit stream, where a current macroblock is represented by data of reference frame and at least one motion vector, comprising the steps of:

detecting the presence of an error in data representing the current macroblock;

estimating the at least one motion vector based upon a difference between a forward reference frame at the current macroblock by a vector and a decoded motion vector for the forward reference frame at the current macroblock positioned by the vector;

if the step of estimating the at least one motion vector based on the difference between the forward reference frame and the decoded motion vector is unsuccessful, estimating the at least one motion vector based upon a decoded motion vector for a macroblock located immediately above the current macroblock; and estimating the current macroblock based upon the estimated at least one motion vector.

2. The method of claim 1 wherein the estimated at least one motion vector is equal to the decoded motion vector for a macroblock located immediately above the current macroblock.

3. The method of claim 2 further including the step of updating a motion vector for use in estimating the macroblock based on the estimated at least one motion vector determined by either steps of estimating the at least one motion vector.

4. The method of claim 3 wherein the macroblock positioned immediately above the current macroblock is defined by a vector having a row index of 1 and a column index of 0.

5. The method of claim 1 further including the step of updating a motion vector for use in estimating the macroblock based on the estimated at least one motion vector determined by either steps of estimating the at least one motion vector.

6. The method of claim 5 wherein the macroblock positioned immediately above the current macroblock is defined by a vector having a row index of 1 and a column index of 0.

7. The method of claim 1 wherein the macroblock positioned immediately above the current macroblock is defined by a vector having a row index of 1 and a column index of 0.

8. An apparatus for concealing errors while decoding a coded video bit stream, where a current macroblock is represented by data of reference frame and at least one motion vector, comprising:

a detector for detecting the presence of an error in data representing the current macroblock;

first means for estimating the at least one motion vector based upon a difference between a forward reference frame at the current macroblock by a vector and a decoded motion vector for the forward reference frame at the current macroblock positioned by the vector:

second means for estimating the at least one motion vector, wherein if the first means for estimating at least one motion vector is unsuccessful, said second means for estimating estimates the at least one motion vector based upon a decoded motion vector for a macroblock located immediately above the current macroblock; and means for estimating the current macroblock based upon the estimated at least one motion vector.

9. The apparatus of claim 8 wherein the estimated at least one motion vector is equal to the decoded motion vector for a macroblock located immediately above the current macroblock.

10. The apparatus of claim 9 further including means for updating a motion vector for use in estimating the macroblock based on the estimated at least one motion vector determined by either of said first and second means for estimating the at least one motion vector.

11. The apparatus of claim 10 wherein the macroblock positioned immediately above the current macroblock is defined by a vector having a row index of 1 and a column index of 0.

12. The apparatus of claim 8 further including means for updating a motion vector for use in estimating the macroblock based on the estimated at least one motion vector determined by either of said first and second means for estimating the at least one motion vector.

13. The apparatus of claim 12 wherein the macroblock positioned immediately above the current macroblock is defined by a vector having a row index of 1 and a column index of 0.

14. The apparatus of claim 8 wherein the macroblock positioned immediately above the current macroblock is defined by a vector having a row index of 1 and a column index of 0.

15. An apparatus for concealing errors while decoding a coded video bit stream, where a current macroblock is represented by data of reference frame and at least one motion vector, comprising:

a detector for detecting the presence of an error in data representing the current macroblock;

a first motion vector estimating unit for estimating the at least one motion vector based upon a difference between a forward reference frame at the current macroblock by a vector and a decoded motion vector for the forward reference frame at the current macroblock positioned by the vector;

a second motion vector estimating unit for estimating the at least one motion vector, wherein if the first estimating unit for estimating at least one motion vector is unsuccessful, said second estimating unit estimates the at least one motion vector based upon a decoded motion vector for a macroblock located immediately above the current macroblock; and an estimating unit for estimating the current macroblock based upon the estimated at least one motion vector.

16. The apparatus of claim 15 wherein the estimated at least one motion vector is equal to the decoded motion vector for a macroblock located immediately above the current macroblock.

17. The apparatus of claim 16 further including an updating unit for updating a motion vector for use in estimating the macroblock based on the estimated at least one motion vector determined by either of said first and second motion vector estimating unit.

18. The apparatus of claim 17 wherein the macroblock positioned immediately above the current macroblock is defined by a vector having a row index of 1 and a column index of 0.

19. The apparatus of claim 15 further including an updating unit for updating a motion vector for use in estimating the macroblock based on the estimated at least one motion vector determined by either of said first and second motion vector estimating unit.

20. The apparatus of claim 19 wherein the macroblock positioned immediately above the current macroblock is defined by a vector having a row index of 1 and a column index of 0.

* * * * *